US011086689B2

(12) United States Patent
Glässel et al.

(10) Patent No.: US 11,086,689 B2
(45) Date of Patent: Aug. 10, 2021

(54) METHOD FOR AUTOMATICALLY AND DYNAMICALLY ASSIGNING THE RESPONSIBILITY FOR TASKS TO THE AVAILABLE COMPUTING COMPONENTS IN A HIGHLY DISTRIBUTED DATA-PROCESSING SYSTEM

(71) Applicant: ATOS CONVERGENCE CREATORS GMBH, Vienna (AT)

(72) Inventors: Michael Glässel, Berlin (DE); Jens-Peter Haack, Berlin (DE); Felix Schmid, Berlin (DE); Gernot Sänger, Berlin (DE)

(73) Assignee: ATOS CONVERGENCE CREATORS GMBH, Vienna (AT)

(*) Notice: Subject to any disclaimer, the term of this patent is extended or adjusted under 35 U.S.C. 154(b) by 58 days.

(21) Appl. No.: 16/312,968

(22) PCT Filed: Jun. 22, 2017

(86) PCT No.: PCT/EP2017/065375
§ 371 (c)(1),
(2) Date: Dec. 21, 2018

(87) PCT Pub. No.: WO2017/220721
PCT Pub. Date: Dec. 28, 2017

(65) Prior Publication Data
US 2019/0227852 A1  Jul. 25, 2019

(30) Foreign Application Priority Data
Jun. 22, 2016  (AT) .............................. A 50566/2016

(51) Int. Cl.
*G06F 9/50* (2006.01)
*G06F 16/22* (2019.01)
*G06F 9/48* (2006.01)

(52) U.S. Cl.
CPC .......... *G06F 9/5083* (2013.01); *G06F 9/4881* (2013.01); *G06F 9/5027* (2013.01); *G06F 9/5072* (2013.01); *G06F 16/2246* (2019.01)

(58) Field of Classification Search
CPC .. G06F 9/5083; G06F 16/2246; G06F 9/4881; G06F 9/5027; G06F 9/5072
See application file for complete search history.

(56) References Cited

U.S. PATENT DOCUMENTS

2011/0307085 A1* 12/2011 Selby ...................... G10L 25/51
700/94
2016/0055023 A1  2/2016 Ghosh et al.
2016/0179581 A1*  6/2016 Soundararajan ...... G06F 9/5033
718/104

FOREIGN PATENT DOCUMENTS

DE  102007018299 B3  10/2008
WO  2017220721 A1  12/2017

OTHER PUBLICATIONS

Foreign Communication from a Related Counterpart Application, International Search Report and Written Opinion dated Oct. 5, 2017, International Application No. PCT/EP2017/065375 filed on Jun. 22, 2017.

* cited by examiner

*Primary Examiner* — Sisley N Kim

(57) ABSTRACT

The invention relates to a method for automatically and dynamically assigning the responsibility for tasks to the available computing components in a highly distributed data-processing system. The invention relates to a method by means of which the assignment of the responsibility for certain tasks (partitions) is adapted in a highly distributed data-processing system.

3 Claims, 2 Drawing Sheets

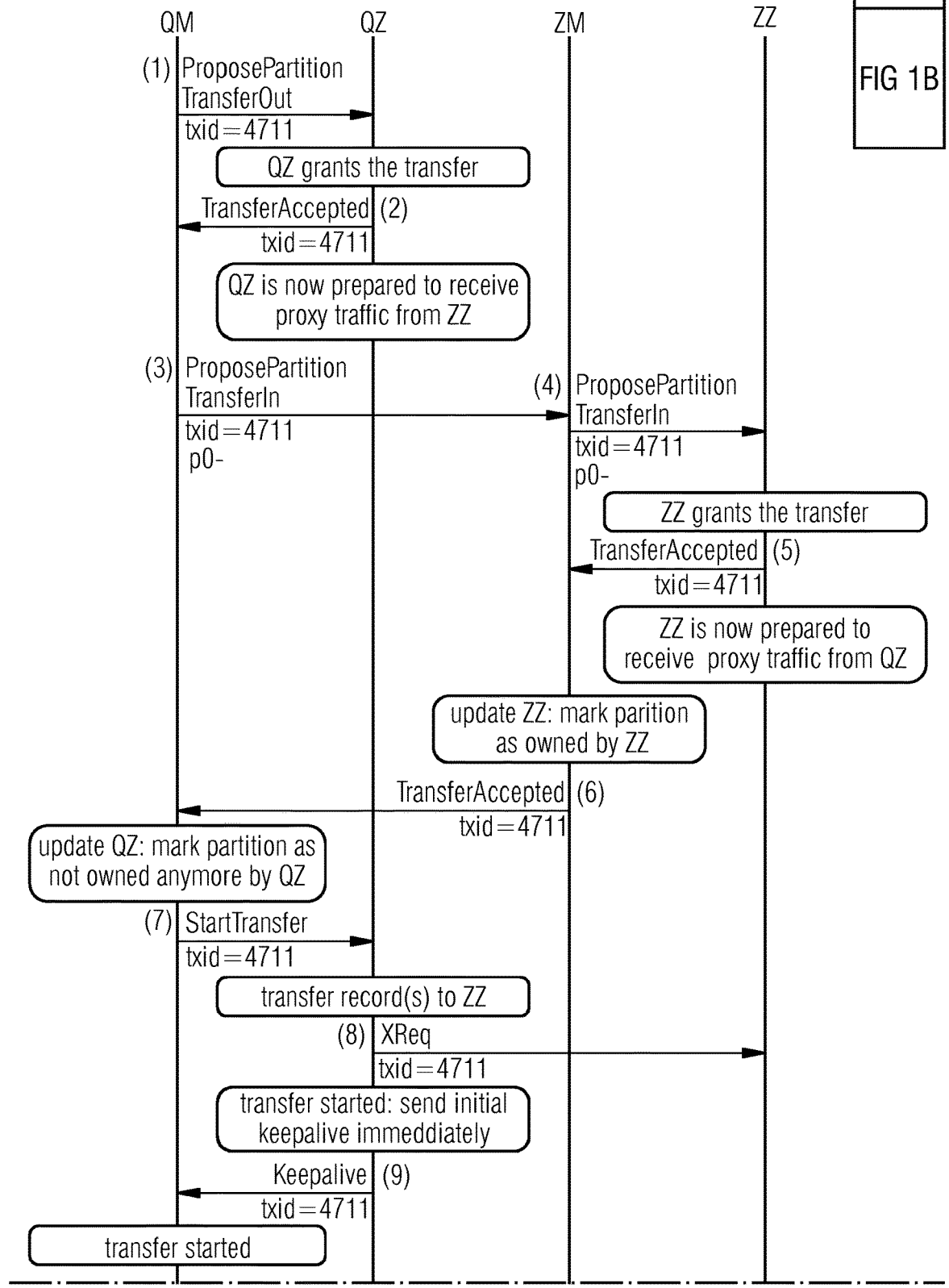
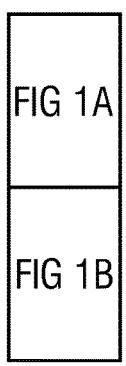

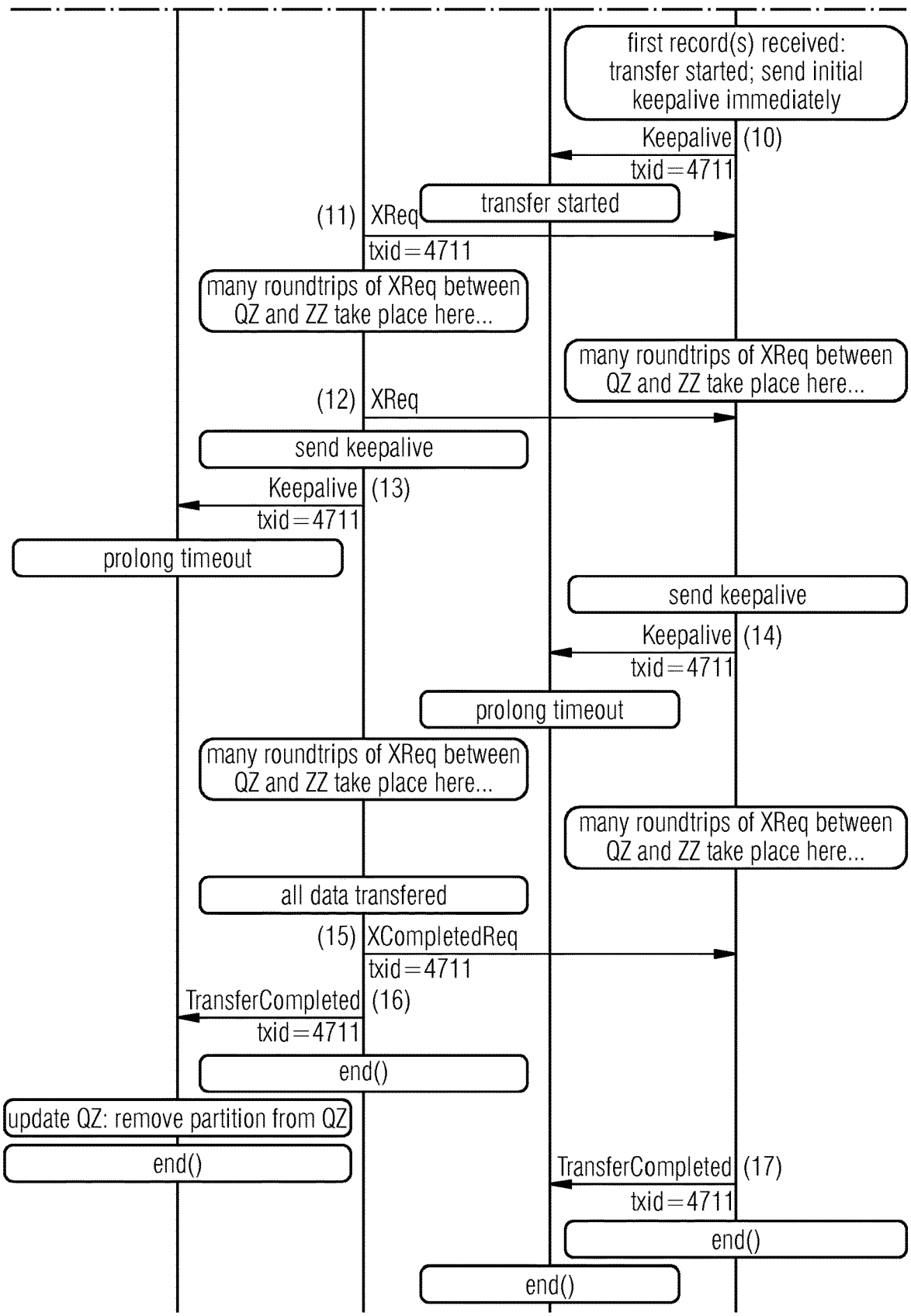

METHOD FOR AUTOMATICALLY AND DYNAMICALLY ASSIGNING THE RESPONSIBILITY FOR TASKS TO THE AVAILABLE COMPUTING COMPONENTS IN A HIGHLY DISTRIBUTED DATA-PROCESSING SYSTEM

CROSS-REFERENCE TO RELATED APPLICATIONS

The present application is a filing under 35 U.S.C. 371 as the National Stage of International Application No. PCT/EP2017/065375, filed Jun. 22, 2017, entitled "METHOD FOR AUTOMATICALLY AND DYNAMICALLY ASSIGNING THE RESPONSIBILITY FOR TASKS TO THE AVAILABLE COMPUTING COMPONENTS IN A HIGHLY DISTRIBUTED DATA-PROCESSING SYSTEM," which claims priority to Austrian Application No. A50566/2016 filed with the Intellectual Property Office of Austria on Jun. 22, 2016, both of which are incorporated herein by reference in their entirety for all purposes.

The invention relates to a method for assigning tasks to the available computing components in a highly distributed data-processing system.

PRIOR ART

In a distributed data processing system in which a multiplicity of computer components contribute their own portion of the processing and storage of data, clear responsibilities for subsets of the transactions to be processed and subsets of the data to be stored, i.e., the tasks to be carried out, must be assigned to the various components. The total quantity of data and the total quantity of transactions is therefore decomposed into subsets (parts, partitions) using the technique of partitioning. In the process, each request and each item of data, i.e. each task, is allocated a unique number (hash value) from a limited range of values and a mapping from any given hash value to a responsible component is defined. This component is then responsible for processing the request and/or storing the data item. Because of the need to distinguish different responsibilities, e.g.: data and index, multiple sets of responsibilities are required in the system.

All components of the data processing system must be able to determine the component responsible for a task, in order to trigger the processing and storage there.

It is known to define partitions using (from . . . to) value ranges, which allows a flexible and fine-grained partitioning. The disadvantage is the need to keep a consistent routing table in all components in the system, as changes to these value ranges would otherwise lead to mis-allocations.

In a highly distributed system such a consistent routing table presents a particular challenge. In order therefore to consistently assign partitions of the components involved even in the event of an inconsistent updating of the routing table, an alternative partitioning procedure is needed.

BRIEF DESCRIPTION OF THE DRAWINGS

FIG. 1 including FIG. 1A and FIG. 1B illustrate a communication sequence between participating components according to an embodiment of the disclosure.

DESCRIPTION OF THE INVENTION

The object of the invention is to specify a method with which in a highly distributed data-processing system the allocation of the responsibility for specific subsets of the data processed (partitions, tasks) is automatically and dynamically adapted to the available computing components. A further object of the invention is to partition tasks in such a way that efficient algorithms can be applied to the synchronization of redundant copies.

According to the invention this object is achieved by a method according to claim 1.

Advantageous configurations of the invention are derived from the dependent claims.

The invention is explained in more detail on the basis of an exemplary embodiment shown in the FIGURE, which shows the sequence of the method according to the invention in schematic form.

According to the invention, in a method for assigning tasks to the available computing components in a highly distributed data-processing system, by a source component QZ which is handling a task, this task is partitioned as required and a portion of the sub-tasks thus obtained is granted to additional computing components ZZ.

A task (partition) division is triggered in the data-processing system, for example, when a computing component needs to be relieved, either because the amount of data in the partition is too high or too many access requests are being made.

The correct processing of the affected tasks by the computer components involved must be guaranteed during the transition.

Each computing component is assigned a control unit, which fulfils administrative tasks for a plurality of components. The control unit responsible for the source component is subsequently designated as the source manager QM. This unit is the trigger of a partitioning process.

The target component, which is to take over a task from the source component, is managed by a further control unit, the target manager ZM. Since each control unit can manage multiple components, the source manager QM and destination manager ZM can also be implemented by one control component.

The assignment of the components to control units can be carried out, for example, based on the physical or virtual location of these components, so that, for example, one control unit is responsible for all the components on a virtual or physical host.

The number of the components and their control units per server depends on the performance capability of the same.

The sequence of the method according to the invention is as follows:

The first step comprises the recognition of the need for a partitioning of tasks. There are a number of different conceivable triggers:
- the existence of a target component without an assigned partition,
- a significant difference in the size of the allocated partitions between two components,
- an overloading of an individual component by access requests (TPS load),
- an over-assignment of an individual component due to stored objects (storage).

If one such trigger has been detected by the responsible control component, the source manager QM, then in a next step a potential target component ZZ is identified.

The information sources for the control components for the detection of triggers are primarily the task routing table of the data-processing system, which is present in all components and distributed for example on the basis of the Gossip protocol, and the memory and CPU assignments reported by the components.

The task routing table contains the partitions of all components and these can therefore be sorted according to size. In a list of components sorted by total partition size, the largest can be compared with the smallest and a decision then taken as to whether a partitioning of tasks is required.

In order for this to be carried out in parallel and in a distributed manner, a plurality of components with large total partition with a plurality of components with a small total partition are examined at the same time as potential candidates, wherein it is always the responsible control unit QM of the source component QZ that initiates this process.

If, for example, a component without a task is identified in the system, then without any further condition another component with above-average sized task (partition) is identified and requested to partition and release its tasks.

Since one component can be assigned multiple tasks, the sum of all assigned tasks is relevant to a utilization comparison. A task is therefore ultimately identified, which is suitable for load balancing and can be transferred (Q->Z).

Thereafter, the agreement to the proposed partition is obtained from both the source component QZ and the selected target component, and further similar requests are blocked for the time being.

This gives both components the option to refuse a proposed partitioning. Possible reasons for this could be, for example, that a partitioning process involving a transfer is already active and the components are awaiting completion of this process, or that the applications on the component cannot currently transfer their status (DB objects or states) for technical reasons.

Only when both components, QZ, ZZ as well as the control unit ZM responsible for the target component ZZ agree, is the partition carried out.

After the completion of the transfer, the new allocation of tasks is confirmed in a task routing table and the procedure is terminated.

FIG. 1 illustrates the communication between the four participating components of source manager QM, source component QZ, target manager ZM, target component ZZ during the method.

A modification of the tasks/partition assignment of any component must be communicated to all components of the data-processing system in the routing.

The exchange of this information takes place preferably on the basis of the so-called Gossip protocol. According to this, changes are only consistently updated in the system after a certain period of time, typically a few seconds, so that until then the old and new routing tables are used simultaneously without any processing errors occurring as a result.

Only the particular responsible control unit may update changes to the partition assignment of a component in the routing table, in order to avoid inconsistencies and collisions of changes, i.e., the deletion of the migrated partition of the source component QZ during the partitioning process is distributed in the system by the source manager QM and the addition of this partition to the target component ZZ is distributed in the system by the target manager ZM.

If a condition exists in the relevant source component that is important to the processing, such as stored data items, index, etc., then this information on the partition will need to be transferred from the source component QZ to the target component ZZ. During this transfer, the responsibility for specific transactions in the system either remains with the source component QZ or already belongs to the target component ZZ. Therefore, during this time a process of forwarding requests from the target component ZZ to the source component QZ and vice versa must be active until the transfer has been completed and the task routing table has been updated.

Depending on the type of data to be transferred, the components are responsible for a unique assignment and consistent modification of the data until the transfer has been fully completed.

Using the method according to the invention, in particular changes in the configuration of the data-processing system are easily handled under full load by addition or removal of a resource.

An extension of the system during operation to include another resource is carried out without manual intervention. The new resource launches empty components (blue-prints), which are provided with a separate login channel and an authorization. Via the login channel, the new components make themselves known to the system and are authorized. At the same time, the running system records the new components in a gossip table. In one of the next gossip transactions to synchronize the system configuration, the new components are integrated and supplied with the current task routing tables.

The new components are then assigned tasks using the method according to the invention.

It may also be necessary for partitioned tasks to be combined again. Examples of triggers for this are:
  a system component being taken out of service before which all tasks of this component must be transferred to other components, or
  the consolidation of a fragmented system.
In this situation there are two possible procedures:
  The migration of partitions to other components, without changing the size of the partitions. (Merging)
  The unification of previously shared partitions as a consequence of step 1. (Unification)

In order to allow a uniform distribution of load and data, it can be advantageous to further subdivide the tasks (partitions) within a component also, for example to further decompose the local partition into 4×¼ partitions. Therefore, instead of a partitioning, a migration of one of these partition fragments may also be carried out. The trigger for a finer subdivision is then dependent on the number of components which the partitions can be split into (this is known in all components due to gossip). An s-stage partitioning then means:
  Take the total number of components of this partition group
  Round up to a power of 2.
  Determine the logarithm to base 2
  Add s to this value.
  Partition to this bit depth in the binary task tree
  Example: 200 components and s=2, rounded up to a power of 2=256, logarithm base 2=8, plus s=2, giving 10-bit depth, thus 1024 partitions. Each component then has 4-6 sub-partitions (roughly 1024/200).

This binary partitioning is used in order to implement an efficient synchronization between redundant copies of partitions.

Redundant copies of a dataset come into being by the fact that the value range for their partitioning is provided multiple times (e.g. 3×). All access requests and data are carried out in parallel in these copies. Since this can result in discrepancies between these copies during the storage of states and data, for example, as a result of data transmission errors, these discrepancies must be repaired.

A particularly advantageous design of the method according to the invention can be used to perform this repair.

This involves a characteristic value being assigned to each task, and the assignment of the task to a computing component of the data processing system being carried out based on the characteristic value.

The characteristic value is determined from the content of each task, for example, the name of a customer, the customer number or telephone number, and represented, for example, as a 64-bit binary value. This value can be calculated based on polynomial division, as is also provided in the cyclic redundancy checking of data.

The assignment of tasks to the computing components then takes place on the basis of these characteristic values, with defined value ranges being assigned to each component.

The definition takes place in a particularly simple manner due to the fact that certain parts of the characteristic values, for example a number of the most significant bits (prefix) specifies an address space, thus 4 bits can be used to assign 16 different computing components, with 8-bit addressing there are components, etc. The 64-bit binary value of the present example is therefore quite sufficient even for very large data-processing systems.

For the example characteristic value 0x76912635011e355a the most significant bits of the binary representation are: 011101101001 . . . .

A component with the prefix 010* does not match the first 3 bits of the characteristic value, but on the other hand, a component with the prefix 01110* matches the first 5 bits. This component is therefore also responsible for this task.

The search for the computing component responsible for a specific task can now be carried out much more simply and faster with a binary tree structure, wherein starting with the most significant bit, each bit represents a branching point of the tree structure.

The binary tree structure of the partitioning can also be used for the above-mentioned repair of the discrepancies between copies, by defining a synchronization procedure starting from an arbitrary binary starting point (hash prefix), with which a discrepancy can be identified and repaired with logarithmic complexity.

In this case, a content characteristic value (digest) is calculated for each data item and aggregated/combined in the tree up to the synchronization node, in order to be able to decide on each level in the tree, by comparing the two child digests (0 and 1), whether a discrepancy lies on the left (0) or right (1) side of the sub-tree.

In an exchange between the synchronization partners using these child digest values, it is possible to identify in the dialog the first difference in the dataset with logarithmic complexity.

The binary tree structure supports the partitioning of tasks according to the invention into two halves (partition division) by replacing one partition entry in the binary task tree by two new entries whose prefix has been extended by one bit.

The total value range can therefore be viewed as a cake which is increasingly finely divided by halving the parts. The resulting parts then represent partitions that are distributed over components.

The method of the invention enables re-partitioning to take place in full operation and even under maximum load, and thus ensures both error-free operation even in the event of an inconsistent, distributed task tree, wherein the computer component to be relieved is no more heavily loaded than before even during the transfer of half of its data from another component, as well as ensuring a fully repartitioned state after a limited amount of time.

The invention claimed is:

1. A method for assigning tasks to available target computing components in a highly distributed data-processing system, comprising:

splitting a given task as required, by a source component which is handling said given task and assigning a part of the subtasks thus obtained to the target computing components, and assigning a characteristic value to each task and carrying out the assignment to a computing component based on said characteristic value, wherein a binary representation of the characteristic value is used as a basis for searching for a responsible target computing component, a given task being assigned to a given computing component if the binary representation of the characteristic value of said given task falls within a defined value range of characteristic values assigned to said given component; and wherein starting with the most significant bit of the characteristic value the entry for the responsible computing component is searched for in a binary tree structure that supports the partitioning of subtasks by replacing one partition entry in the binary tree structure by two new entries whose prefix has been extended by one bit.

2. The method as claimed in claim 1, wherein the need to partition a task is determined based on the utilization of the available computing components of the system.

3. The method as claimed in claim 1, wherein one computing component handles a plurality of tasks.

* * * * *